Sept. 11, 1956        J. H. JEFFREE        2,762,279
CAMERAS FOR STEREOSCOPIC PHOTOGRAPHY
Filed July 29, 1952
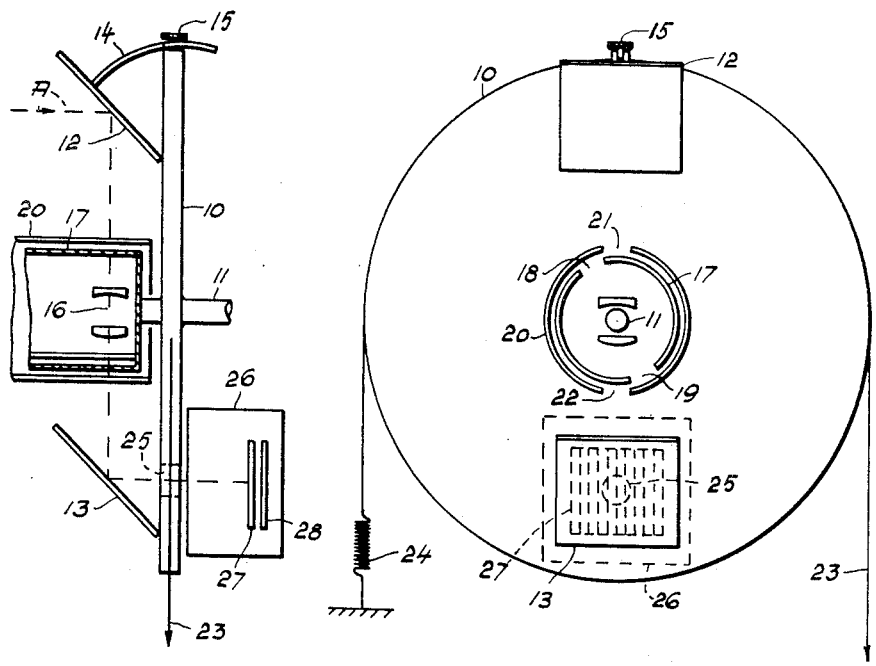
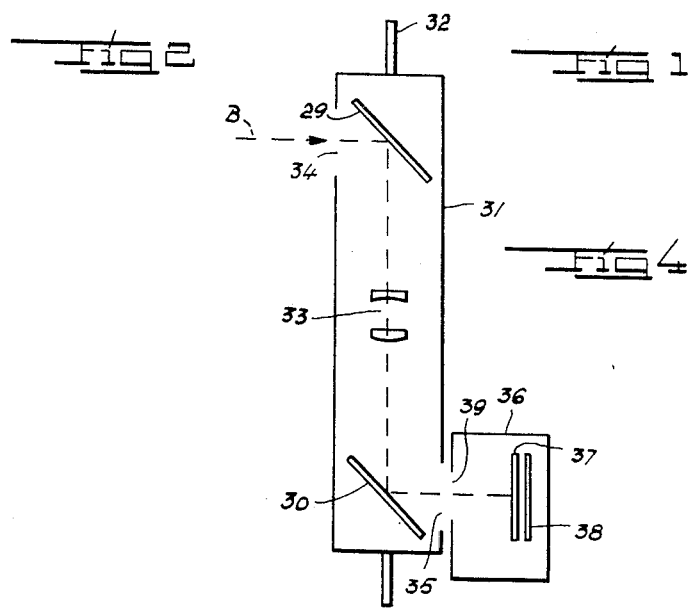
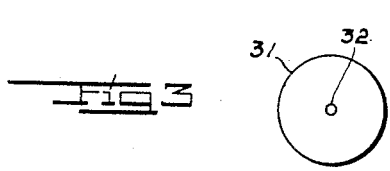
Inventor
John H. Jeffree
by Malcolm W. Pratt
attorney

United States Patent Office 2,762,279
Patented Sept. 11, 1956

2,762,279

CAMERAS FOR STEREOSCOPIC PHOTOGRAPHY

John Henry Jeffree, Cobham, England, assignor to Peter Koch de Gooreynd, Petworth, England Application July 29, 1952, Serial No. 301,471

11 Claims. (Cl. 95—18)

The present invention relates to an improved camera for taking stereoscopic photographs, and is more particularly concerned with those cameras which employ a vertical grid, such as a series of parallel cylindrical lenses, arranged in front of the camera plate.

In taking pictures with such a grid a spherical lens (or lens system) is focussed to produce an image of the object in a plane adjacent the grid, and the lens and lenticular grid together produce a final image from which, after development and reversal, a stereoscopic image can be reproduced by viewing it through a grid system similar to the taking grid.

The spherical lens system in the camera serves the purpose primarily of producing a reduced image of the object near the photographic plate. (Vertical variations of detail of this image are recorded as in normal photography, the grid playing no part.) Horizontal variations of detail of this image are recorded through each grid element according to their horizontal distribution round it. This distribution when reproduced by viewing the record through a similar grid is the reverse of what is required to be seen for a true stereoscopic picture, owing to the reversed direction of viewing. It order to correct this it is necessary, if the image on the plate is inverted and the plate is stationary, to arrange that light diverging from the object to a definite degree towards the left side of the camera shall reach the plate from a corresponding direction on the right side of the camera, and vice versa. One object of this invention is to provide a method and means of achieving this end.

Other objects are to achieve a marked degree of stereoscopic effect without large lenses or other expensive apparatus such as splitters and with relatively portable and inexpensive apparatus, to enable photographs of objects at various distances to be taken without alternations to the apparatus other than focusing, and to enable conveniently short exposures to be used.

Preferred forms of the invention will now be described with reference to the accompanying diagrammatic drawings, in which Figure 1 is an end elevation of a camera constructed in accordance with this invention, Figure 2 is a side view of the same camera, Figure 3 is a side view of an alternative form of camera and Figure 4 is a plan of the camera of Figure 3.

Referring first to Figures 1 and 2, the camera here shown comprises a rotary carrier in the form of a disc 10 fixed on an axis 11 which is mounted for reciprocal rotary movement in bearings (not shown) housed in the camera body.

Fixed on the disc at diametrically opposite positions are two plane mirrors 12 and 13 the upper one of which is angularly adjustable on the disc by means of an arcuate slotted bracket 14 and screw 15. The mirrors are each inclined at about 45 degrees to the axis 11. Mounted at approximately the centre of the disc is an optical system 16 which is contained by a housing 17 and rotates with the disc. The housing 17 is formed with two apertures 18 and 19 co-operating with a fixed obturator 20 having two apertures 21 and 22. The fixed obturator 20 and movable housing 17 together cooperate as an exposure shutter when the disc is rotated, which is done with the aid of a cable 23 which is wound around the disc and has one end attached to a spring 24 the other end of which is secured to a fixed portion of the camera body.

The disc 10 is formed with an eccentrically placed aperture 25 facing the lower mirror 13.

On that face of the disc opposite the mirrors is a plate holder 26 containing a lenticular grid 27 and photograph plate 28. These may be of any known or suitable kind for taking stereoscopic photographs.

Light passes through the camera in the direction of arrow A and the camera is provided with an adequate light excluding and light trapping housing, which has not been shown since it may take any convenient form.

In order to use the camera the lens system 16 is focussed in the ordinary way, the cable 23 is pulled downwards so that the movable apertures 18 and 19 are pulled over and across the fixed apertures 21 and 22, the plate is uncovered in the holder 26 and the cable 23 is then released to allow the movable apertures 18 and 19 to pass at uniform speed across the fixed apertures 21 and 22, under the action of the spring 24.

In the alternative embodiment of the invention illustrated in Figures 3 and 4, a pair of mirrors 29 and 30 are mounted within a hollow cylindrical housing 31 which is mounted for rotation about a vertical axis 32. One of the mirrors (or both) may be adjustable in position. Also mounted within the housing at approximately its centre is a lens system 33 which may rotate with the with the housing. The latter is formed with two apertures 34 and 35 and opposite one of the apertures is a fixed plate holder 36 containing a vertical lenticular grid 37 and photographic plate 38. Light passes through the system in the direction of arrow B. The plate holder is formed with an aperture 39 which co-operates with the aperture 35 to constitute an exposure shutter.

This camera is used in precisely the same way as the one above described.

In both examples of the invention described the disposition of the lens and mirrors on the carrier is such that a stationary image is formed on the photographic plate of those parts of the object which are at a predetermined distance from the camera. The movement on the plate of images of parts of the object which are at different distances is such as to give, in conjunction with the lenticular grid, a stereoscopic effect.

One (or both) of the mirrors is made adjustable so that the distance at which objects are imaged without movement on the plate can be varied. The means for making such changes may be coupled with means for focusing the lens system.

Since in the second form of this invention described above there is a tilting of the optic axis of the lens as imaged in the mirrors as the moving member rotates, relative to the plate, the lens may be arranged to give sharp definition on a field surface more or less concentric with itself, and a field corrector lens may be provided on the stationary member to flatten this field, if desired.

In either of the examples of the invention described the lens may conveniently comprise (as shown) a diverging component or sub-system receiving light from the object and thence passing it through a converging component or sub-system to the plate. Focusing may be achieved by movement of one such component or sub-system only, for instance the diverging one, and thereby large changes of focus can be made with relatively small movements of the components.

I claim:

1. A camera for taking stereoscopic photographs, comprising a photographic plate, a stereoscopic grid adjacent the plate, a spherical lens system for focusing an image of an object upon the grid, a carrier mounted for rotation about an axis, two mirrors mounted on the carrier so as to be obliquely inclined to the optic axis of the lens system and located one on either side of the lens system, and means for moving the mirrors so that the optic axis between the object and first mirror and that between the second mirror and the image are displaced horizontally in opposite senses, thereby producing a stationary image on the plate of objects which are at a predetermined distance from the camera.

2. A camera as claimed in claim 1, comprising a common carrier for the two mirrors and means for rotating the carrier about a common axis which lies in a vertical plane substantially normal to the photographic plate.

3. A camera as claimed in claim 1, comprising a common carrier for the two mirrors and means for rotating the carrier about an axis of rotation which lies between the mirrors and is substantially normal to the plate.

4. A camera as claimed in claim 1, comprising a common carrier for the two mirrors and means for rotating the carrier about an axis of rotation which passes through the two mirrors and is substantially parallel to the plane of the photographic plate.

5. A camera as claimed in claim 1, wherein the carrier is mounted for rotation about an axis which lies between the mirrors, passes through the optic axis, and is substantially normal to the grid.

6. A camera as claimed in claim 1, wherein the carrier is in the form of a disc formed with an eccentric aperture and the two mirrors which are inclined obliquely to the axis of the disc, are located diametrically opposite one another on one face of the disc, and one of which is adjacent the aperture.

7. A camera as claimed in claim 1, wherein the carrier is mounted for rotation about an axis which passes through the two mirrors and is parallel to the lines of the grid.

8. A camera as claimed in claim 1, wherein the carrier is formed with an aperture, and, comprising a fixed obturator formed with an aperture co-operating with the aperture in the carrier to constitute an exposure shutter.

9. A camera as claimed in claim 1, comprising a spring between the carrier and a fixed portion of the camera body serving to urge the carrier in one angular sense and against which spring the carrier may be manually rotated so that the mirrors are moved in equal and opposite directions laterally of the grid.

10. A camera as claimed in claim 1, wherein the carrier is in the form of a disc formed with an eccentric aperture and carries two mirrors which are inclined obliquely to the axis of the disc, are located diametrically opposite one another on one face of the disc and one of which is adjacent the aperture, wherein the lens system is mounted approximately at the center of the disc so as to be rotatable therewith and having its optic axis passing through the two mirrors.

11. A camera as claimed in claim 1, wherein the carrier is in the form of an elonagte box mounted for rotation about its longitudinal axis, the two mirrors are mounted within the box obliquely to the axis of rotation of the box and the box is formed with apertures in its longitudinal walls in positions such that light may pass on to one mirror, thence to the other and finally to the grid.

References Cited in the file of this patent

UNITED STATES PATENTS

| | | |
|---|---|---|
| 1,602,251 | Quidor | Oct. 5, 1926 |
| 1,950,374 | Kanolt | Mar. 6, 1934 |
| 2,174,766 | Terwilliger | Oct. 3, 1939 |